(12) United States Patent (10) Patent No.: US 12,638,931 B2

Braun (45) Date of Patent: May 26, 2026

(54) PALM MOUSE

(71) Applicant: Keith D. Braun, Fort Washington, MD (US)

(72) Inventor: Keith D. Braun, Fort Washington, MD (US)

( * ) Notice: Subject to any disclaimer, the term of this patent is extended or adjusted under 35 U.S.C. 154(b) by 0 days.

(21) Appl. No.: 19/315,083

(22) Filed: Aug. 29, 2025

(65) Prior Publication Data

US 2026/0086658 A1 Mar. 26, 2026

Related U.S. Application Data

(60) Provisional application No. 63/698,432, filed on Sep. 24, 2024.

(51) Int. Cl.
G06F 3/0354 (2013.01)

(52) U.S. Cl.
CPC ................................ G06F 3/03543 (2013.01)

(58) Field of Classification Search
CPC ...... G06F 3/0304; G06F 3/0312; G06F 3/033; G06F 3/0354; G06F 3/03543; G06F 3/03544

See application file for complete search history.

(56) References Cited

U.S. PATENT DOCUMENTS

| | | | | | |
|---|---|---|---|---|---|
| 6,169,537 | B1 * | 1/2001 | Taft | ..................... | G06F 3/03543 345/157 |
| 7,006,074 | B2 * | 2/2006 | Chesters | ............... | G06F 3/0312 345/161 |
| 7,663,601 | B1 * | 2/2010 | Hotelling | .............. | G06F 1/3215 345/163 |
| 10,599,233 | B1 * | 3/2020 | Amalou | ................. | G06F 3/0346 |
| 11,231,791 | B1 * | 1/2022 | Jentz | ........................ | G06F 3/016 |
| 2002/0175894 | A1 * | 11/2002 | Grillo | ..................... | G06F 3/014 345/156 |
| 2005/0190155 | A1 * | 9/2005 | Pollenz | .............. | G06F 3/03543 345/163 |
| 2005/0275625 | A1 * | 12/2005 | Koenig | .................. | G06F 3/033 345/156 |
| 2008/0136778 | A1 * | 6/2008 | Hursh | ..................... | G06F 3/014 345/164 |
| 2024/0427432 | A1 * | 12/2024 | Lorenz | ................ | G06F 3/03543 |
| 2026/0086658 | A1 * | 3/2026 | Braun | ................. | G06F 3/03543 |

* cited by examiner

*Primary Examiner* — Patrick F Marinelli

(74) *Attorney, Agent, or Firm* — Law Office of Jeff Williams PLLC; J. Oliver Williams

(57) ABSTRACT

A palm mouse includes a main body with a plurality of interfaces to permit the receipt and transmission of signals and data. The main body includes circuitry internally to permit the transmission of the signals and the data externally to the main body. A base is formed into the main body at a lower area. The interfaces may include both a finger interface and a thumb interface. Each is permitted to regulate transmission of data and signals. A strap is coupled to the main body at at least two points and is configured to fold over on itself and be adjustable. A power supply is located within the main body in communication with the circuitry. A user's hand slides between the strap and the main body to align itself with the different interfaces.

7 Claims, 2 Drawing Sheets

101

107

109

103

105

107

111

101

103

113

115

105

PALM MOUSE

CROSS REFERENCE TO RELATED APPLICATIONS

This application claims the benefit of an earlier filing date and right of priority to U.S. Provisional Application No. 63/698,432, filed 24 Sep. 2024, the contents of which is incorporated by reference herein in its entirety.

BACKGROUND OF THE INVENTION

1. Field of the Invention

The present application relates to a tool for navigating through an electronic software device, and more particularly to a portable hand held mouse.

2. Description of Related Art

The computer mouse, an essential tool for modern computing, was first developed in the mid to late 1960s by Douglas Engelbart and his team at the Stanford Research Institute. The initial design, known as the "X-Y Position Indicator for a Display System," featured a wooden shell and two metal wheels, allowing users to navigate graphical interfaces more intuitively than with a keyboard alone. The term "mouse" originated from its resemblance to a small rodent, complete with a cord tail connecting it to the computer. Early versions utilized mechanical tracking with a rolling ball to detect movement, a design that dominated the market for several decades.

As technology progressed, the mouse evolved significantly. By the 1980s, optical mice, which use a light-emitting diode and photodiodes to detect movement relative to a surface, began to emerge, offering greater precision and durability without the need for a rolling ball. The advent of wireless technology in the late 1990s further enhanced the mouse's functionality, freeing it from physical cords and improving user convenience. Today, the mouse remains a crucial input device, widely used alongside touchpads and touchscreens, due to its ergonomic design and efficiency in facilitating detailed, precise control of computer interfaces.

In the realm of computer interaction, one of the most persistent issues is the inefficiency created by the constant switching between mouse and keyboard. Traditional computer mice, while highly effective for navigation and selection, necessitate frequent hand movements away from the keyboard. This back-and-forth action disrupts the user's workflow, breaks concentration, and can result in significant cumulative time loss, particularly during tasks that require intensive typing and frequent cursor movements. Additionally, this repetitive motion can contribute to physical strain, increasing the risk of repetitive stress injuries.

Moreover, the physical design of standard mice often requires users to reorient their hands and visually locate the mouse each time they switch from typing to pointing. This process, although seemingly trivial, can lead to a fragmented user experience and decreased productivity. The constant need to reposition the hand breaks the flow of work, leading to micro-interruptions that can accumulate into substantial delays over extended periods. Addressing this challenge requires a solution that seamlessly integrates mouse functionality with the user's hand movements, maintaining ergonomic efficiency and minimizing disruption.

Although strides have been made, shortcomings remain.

BRIEF SUMMARY OF THE INVENTION

It is an object of the present application to Provide a mouse assembly that is configured to be situated vertically within the palm of a user's hand. It is an object of the present application to have the mouse assembly include these are interfaces that are operable with the various fingers and thumbs of a user. A further object of the present application includes different styles of interfaces such as buttons, roller balls, scrolls, and tactile surface pads.

It is a further object of the present application that The mouse assembly is configured to transmit and receive signals and data to a remote computer. Furthermore the assembly is formed to be ergonomical so as to facilitate and ease of gripping by the user's hand.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
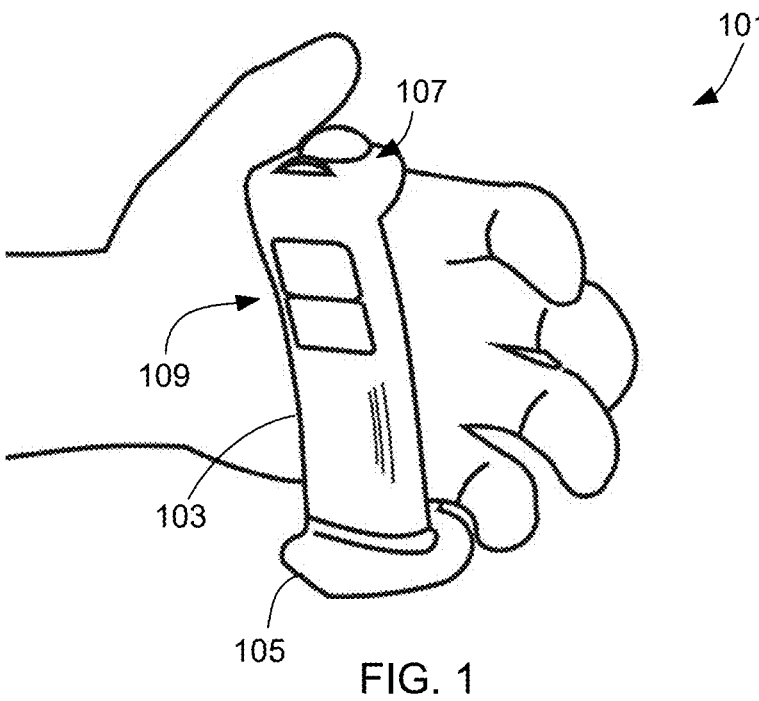
FIG. 1 is a perspective view of a palm mouse according to an embodiment of the present application.
Figure 2:
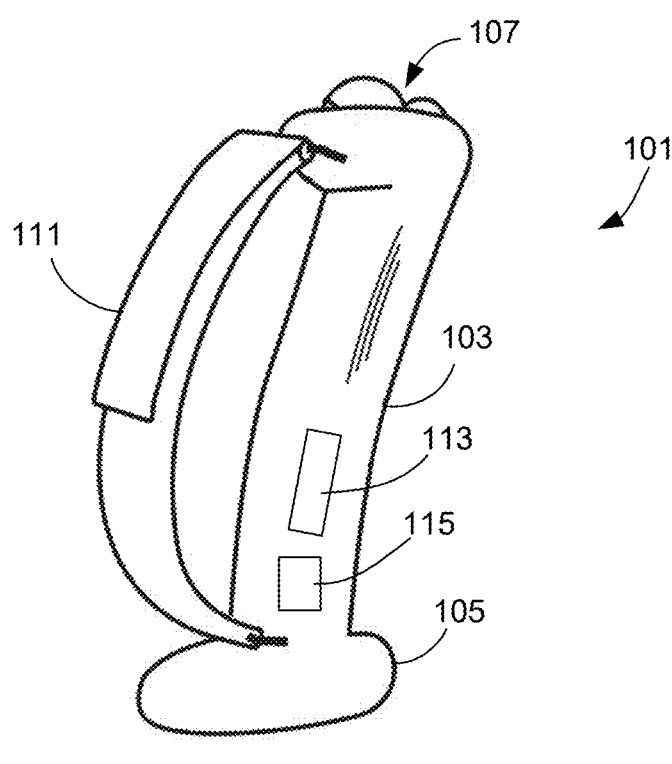
FIG. 2 is a side view of the palm mouse of FIG. 1.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

The palm mouse of the present application is configured to provide a revolutionary solution to the inefficiencies of traditional mouse and keyboard interactions by combining the functionality of a standard mouse with the ergonomic design of a hand-held device. It is designed to fit comfortably in the palm of either hand of a user. The palm mouse features an optical sensor for precise tracking and a unique configuration that allows users to operate it without lifting their hands away from the keyboard. With pressure sensors that deactivate the device when lifted from a surface, the palm mouse ensures that users can seamlessly transition between typing and navigating without losing focus or breaking their workflow.

In addition to its ergonomic design, the palm mouse includes a hook and loop fastener facilitating an adjustable strap to secure the device to the user's hand. This enables easy switching between mouse and keyboard tasks without the need to reorient or visually locate the mouse. The strategically placed buttons and scroll wheel align with the natural positioning of the thumb and fingers, facilitating intuitive control and reducing the risk of repetitive strain injuries. By streamlining the interaction process and maintaining constant hand-to-device contact, the palm mouse enhances productivity and offers a more efficient, user-friendly computing experience.

Referring now to FIGS. 1-4 in the drawings, a palm mouse 101 is illustrated. Mouse 101 includes a main body 103 and a base 105. A user's hand grasps main body 103 to facilitate operation of mouse 101. Main body 103 includes a number of interfaces to allow a user to manipulate a direction pointer, cursor, or "mouse" on a computer screen. This may include a thumb interface 107 and a finger interface 109. Main body 103 is ergonomically molded so as to accommodate comfortably the shape of a user's hand. The fingers of the hand are configured to wrap around to finger interface 109. Thumb interface 107 is located along a top surface of main body 103 and is primarily suited for operation via manipulation of the user's thumb. Each user interface may be manipulated simultaneously by a single user hand to allow operational control of a remote computer.

Mouse 101 further includes a strap 111 selectively coupled to portions of main body 103 and or also including a connection point to base 105, strap 111 having one or more fasteners to allow the user to tighten and release a compressive force onto the back of their hand. Exemplary fasteners may include snaps, buttons, or hook and loop fasteners. Strap 111 acts as a safety device in that it prevents mouse 101 from falling or becoming dislodged from a user's hand in operation. It should be understood that base 105 is selectively removable from main body 103.

Within main body 103 is circuitry 113 having one or more processors and electronic control units having input output interfaces to permit the transmission of signals and data externally to the main body 103, between mouse 101 and a remote electronic computer. Mouse 101 is configured to operate wirelessly when transmitting and receiving data and may include a power supply 115. Power supply 115 is configured to be a rechargeable power supply such as a rechargeable battery. It is configured to provide power to each interface 107 and 109 along with circuitry 113.

Figures 3, 4:
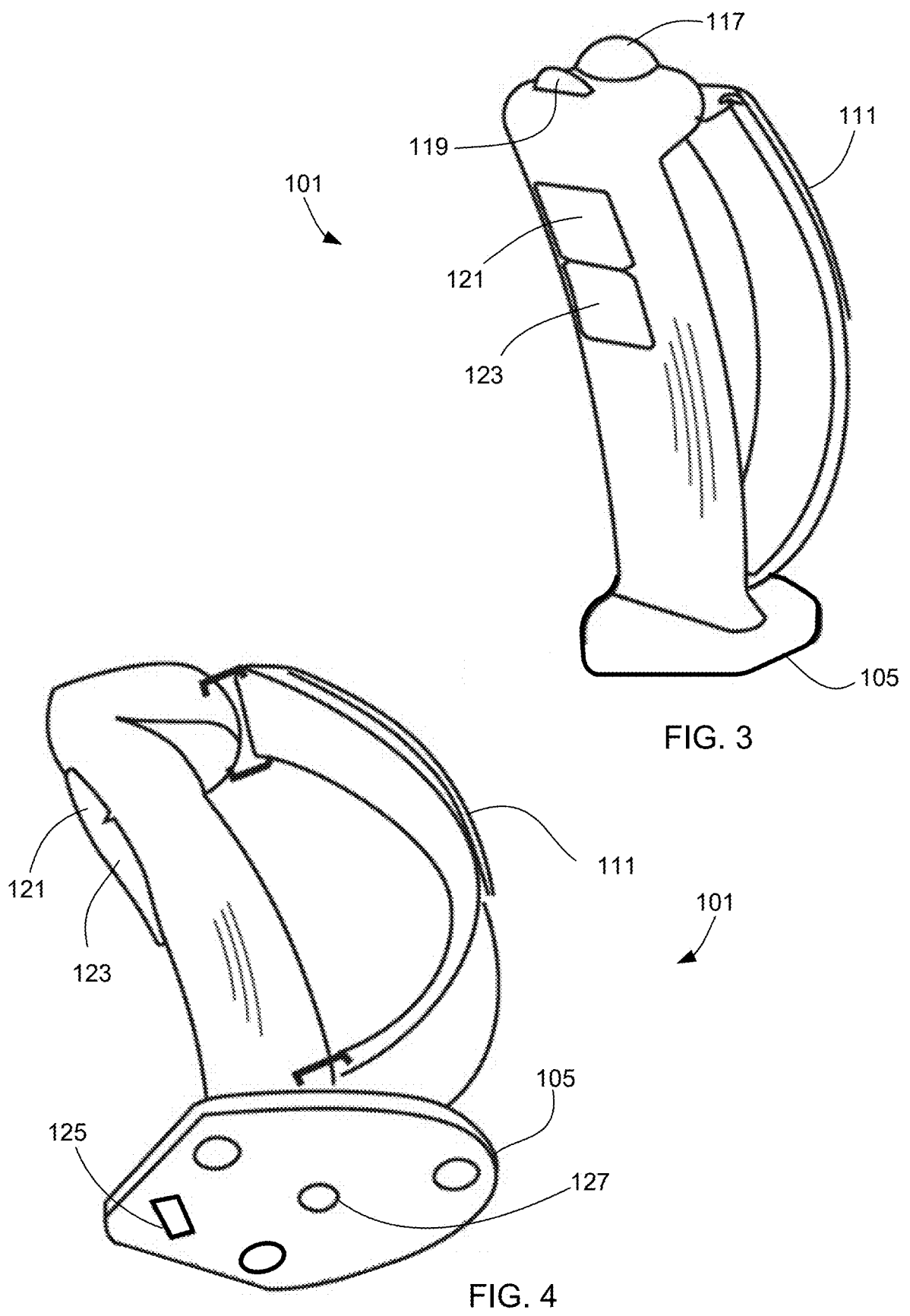
FIG. 3 is a rear perspective view of the palm mouse of FIG. 1.
FIG. 4 is a lower perspective view of the palm mouse of FIG. 1.

Concerning FIG. 3 in the drawings, a rear perspective view of mouse 101 is illustrated. This view provides an enhanced image of interfaces 107 and 109. Interface 107 consists of a roller ball 117 and a scroll wheel 119. Each is operable via the thumb. Operation is similar to other common devices. With a user's thumb, the user is able to manipulate the roller ball 117 to move the digital mouse on the screen. Manipulation of scroll wheel 119 may be provided to advance up or down a window on the screen of a computer. It is understood that the functions of roller ball 117 and scroll wheel 119 are not limited to the description provided here. It should be understood that manipulation of such devices affects the positioning of a digital cursor or mouse on a computer screen.

Interface 109 is located along a rear surface of main body 103 and is located in a manner so as to be easily acceptable with the relative tips of a user's fingers. In operation each of the selectors may be operable by an individual finger, or however, a user may choose to use one finger to operate both interfaces. Interface 109 includes selector 121 and selector 123. The function of selectors 121 and 123 are similar to those of the right click and left click functions on a conventional mouse. Operation of selectors 121 and 123 assist in navigating through windows shown on a computer screen and in the selection of data shown. It is understood that the number of selectors may be increased or decreased and may facilitate further functions than those described here.

Referring now specifically to FIG. 4 in the drawings, a lower perspective view of mouse 101 is illustrated. In this view a lower surface of base 105 is provided. It is reiterated that base 105 is optional and may be removed from main body 103. Mouse 101 includes an on off switch 125 as well as a position sensor 127. On off switch 125 performs the functions of turning on and off mouse 101. Position sensor 127 may be that of an LED position sensor that incorporates light, but is configured to detect the location of mouse 101 relative to a surface. Sensor 127 is in communication with circuitry 113 and power supply 115 and is configured to relay position data. This position data is configured to detect one mouse 101 is resting on a surface along the lower surface of base 105. In all, sensor 127 is configured to deactivate mouse 101 when it is lifted from a flat surface so as to prevent accidental movements and conserve battery life.

As noted previously, a value in having sensor 127 is found wherein mouse 101 is operable on a user's hand while the user may be using that hand to type on a keyboard. When used in this manner it can be difficult to avoid contact with any of the interfaces 107 and 109. Therefore sensor 127 allows mouse 101 to selectively deactivate inputs received through interfaces 107 and 109 when not resting on a surface. This is highly useful in avoiding inadvertent contact and movement of the mouse pointer on the screen. In operation the user can seamlessly transition between typing and navigating by merely rotating their arm to rest mouse 101 on a surface nearby. Strap 111 is used to hold mouse 101 within the palm of the user's hand as the user is typing on a keyboard.

Mouse 101 is optimally sized to fit comfortably in the palm of the user's hand and ensures easy and intuitive operation without obstructing the keyboard use. The ergonomic shape reduces the need for constant hand repositioning, thereby enhancing user comfort and efficiency. It is understood that main body 103 may be made from one or more components to facilitate easy access within an internal volume where circuitry 113 and power source 115 are located. It can be seen that the current device has many advantages over conventional offerings. It should also be specified that mouse 101 may be operable in either hand (right or left) of a user.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A palm mouse, comprising:
   a main body having circuitry internally therein and configured to permit the transmission of signals and data externally to the main body;
   a base coupled to the main body;
   a user interface coupled to the main body, the user interface in communication with the circuitry for regulating the transmission of the signals and data;
   a second user interface, the second user interface is a thumb interface extending outward from the main body along a top surface, and the thumb interface comprises of a rollerball and a scroll wheel; and
   a strap coupled to the main body at two points, the strap is configured to fold over on itself and be adjustable,
   wherein the user interface is a finger interface formed into the main body and comprises of at least two selectors,
   wherein manipulation of the roller ball moves a digital mouse on a screen, and
   wherein the base includes a position sensor that deactivates inputs received through the user interface and the second user interface when the palm mouse is not resting on a surface.

2. The palm mouse of claim 1, wherein the user interface and the second user interface may be manipulated simultaneously.

3. The palm mouse of claim 1, wherein the strap includes a fastener.

4. The palm mouse of claim 3, wherein the fastener is at least one of a snap, a button, and a hook and loop fastener.

5. The palm mouse of claim 1, further comprising: a power supply located within the main body in communication with the circuitry.

6. A palm mouse, comprising:
   a main body having circuitry internally therein and configured to permit the transmission of signals and data externally to the main body;
   a base coupled to the main body;
   a first user interface coupled to the main body, the first user interface is a finger interface formed into the main body and comprises of at least two selectors;
   a second user interface coupled to the main body, the second user interface is a thumb interface extending outward from the main body along a top surface, the thumb interface comprises of a rollerball and a scroll wheel;
   a strap coupled to the main body at at least two points, the strap is configured to fold over on itself and be adjustable; and
   a power supply located within the main body in communication with the circuitry;
   wherein the first and second interfaces are in communication with the circuitry for regulating the transmission of the signals and data,
   wherein manipulation of the roller ball moves a digital mouse on a screen, and wherein the base includes a position sensor that deactivates inputs received through the user interface and the second user interface when the palm mouse is not resting on a surface.

7. The palm mouse of claim 6, wherein the fastener is at least one of a snap, a button, and a hook and loop fastener.

* * * * *